A. COCKINS.
DISH DRAINER.
APPLICATION FILED DEC. 20, 1912.
1,059,350.
Patented Apr. 22, 1913.
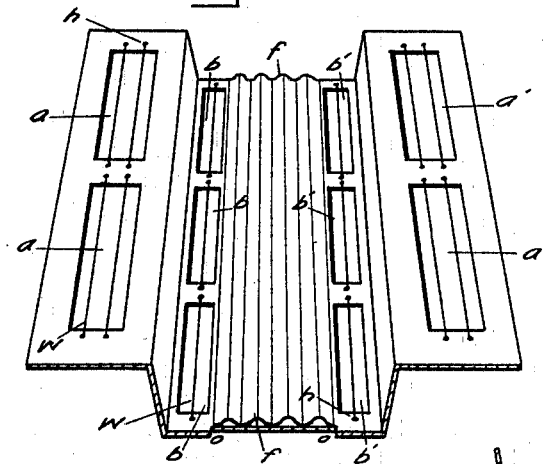
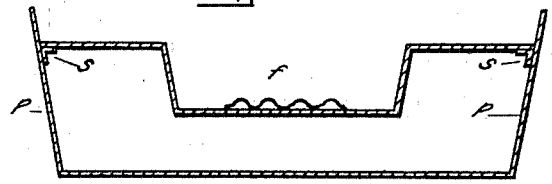
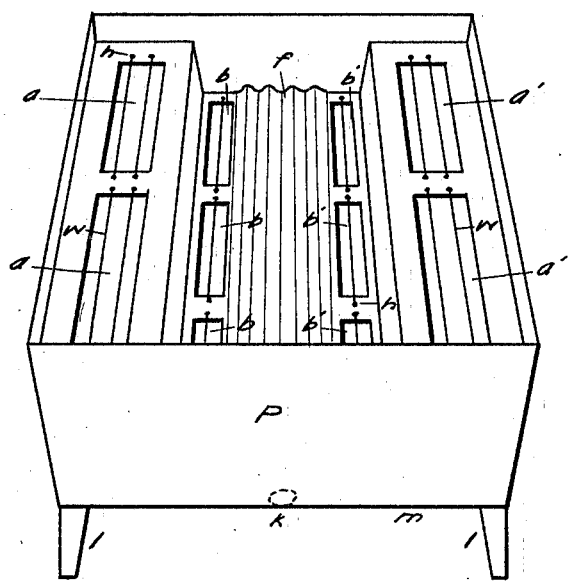
WITNESSES:
Walter Turner
J. K. Young
INVENTOR.
Almira Cockins
BY John P. Turner
ATTORNEY.

UNITED STATES PATENT OFFICE.

ALMIRA COCKINS, OF NEW CONCORD, OHIO.

DISH-DRAINER.

1,059,350. Specification of Letters Patent. Patented Apr. 22, 1913.

Application filed December 20, 1912. Serial No. 737,852.

*To all whom it may concern:*

Be it known that I, ALMIRA COCKINS, a citizen of the United States, residing at New Concord, in the county of Muskingum and State of Ohio, have invented a new and useful Dish-Drainer, of which the following is a specification.

My invention relates to improvements in dish drainers, and has for its objects, first to provide a dish drainer that will dispense with the work of wiping the dishes after washing; and second to provide a dish drainer that will hold the dishes in a vertical position, and also prevent them from coming in contact with each other while in the process of draining or drying. I obtain these objects by the device illustrated in the accompanying drawing, in which:—

Figure 1 is a view in perspective of the dish rack proper, showing the four larger rectangular slots, $a$, $a$, and $a'$ $a'$, and the six smaller rectangular slots $b$, $b$, $b$, and $b'$, $b'$, $b'$, with the fluted bottom $f$, $f$, intervening. Fig. 2 is a view in perspective of the complete device, including the pan P, the four sided vessel in which the dish rack, (Fig. 1), rests, and Fig. 3 is a vertical section of the complete device showing sides of pan, $p$, $p$, supports for dish rack $s$, $s$, and fluted bottom $f$, $f$.

Similar letters refer to similar parts throughout the several views.

The larger rectangular slots $a$, $a$, and $a'$, $a'$, are eleven inches long and four and one-half inches wide and each is divided into three spaces by the wires, $w$, each space being sufficiently long and wide to admit one dinner plate when placed edgewise.

The smaller slots $b$, $b$, $b$, and $b'$, $b'$, $b'$, are nine inches long and two inches wide, and are each divided into two spaces by wires in a similar manner to that described with reference to the larger slots, each space being sufficiently large to admit smaller plates than those described above. The smaller dishes not heretofore mentioned are to be inverted on the fluted bottom $f$, $f$. The wires used in dividing the slots are held in place by passing the ends through the holes at the end of the slots and clinching them on the under side. The dish rack (Fig. 1), when placed in the pan P, rests on the supports $s$, $s$, (Fig. 3) which are soldered to the sides and ends of the pan P, extending continuously around the same. The dish rack can be removed at will for the purpose of cleaning. The oblong opening $o$, $o$, at the end of the fluted bottom $f$, $f$, allows the drainage from the dishes to run through the bottom of the dish rack to the bottom of the pan, and then to pass through a second opening, $k$, immediately under the end of the pan, into any vessel placed in position to catch the same, the legs, $l$, $l$, supporting that end of the pan P, being slightly shorter than those at the other end, thus, cause the water to run toward the openings $o$, $o$, and $k$.

This device may be made of tin, copper or galvanized iron, all immovable joints being secured by solder.

I claim:

A dish drainer comprising a pan, supports along the inner sides on which rests a dish supporting plate or rack, comprising a sheet of material having a depressed central portion and raised side portions, the plate being provided with slots in the raised and depressed portions, and a fluted bottom in the depressed portion of the plate, substantially as shown, and for the purposes specified.

ALLIE COCKINS.

Witnesses:
WALTER TURNER,
J. K. YOUNG.

---

Copies of this patent may be obtained for five cents each, by addressing the "Commissioner of Patents, Washington, D. C."